United States Patent
Bruneau et al.

[11] Patent Number: 6,078,558
[45] Date of Patent: Jun. 20, 2000

[54] OPTICAL RECORDING MEDIUM HAVING TWO SUPERIMPOSED RECORDING LEVELS AND CORRESPONDING RECORDING DEVICE AND READING PROCESS

[75] Inventors: Jean-Michel Bruneau, Vinay; Bernard Bechevet, Claix, both of France

[73] Assignee: Commissariat a l'Energie Atomique, Paris, France

[21] Appl. No.: 09/099,132

[22] Filed: Jun. 18, 1998

[30] Foreign Application Priority Data

Jul. 2, 1997 [FR] France .................................. 97 08348

[51] Int. Cl.⁷ ..................................................... G11B 7/24
[52] U.S. Cl. ........................................... 369/275.2; 369/13
[58] Field of Search .............................. 369/275.4, 275.3, 369/275.1, 94, 284, 286, 13, 275.2, 100, 109, 275.5, 121, 112, 288, 44.12, 44.23, 44.13, 110, 111; 360/114; 428/694 ML, 694 SC, 64.4

[56] References Cited

U.S. PATENT DOCUMENTS

| | | | |
|---|---|---|---|
| 5,153,873 | 10/1992 | Spruit et al. ......................... | 369/275.2 |
| 5,255,262 | 10/1993 | Best et al. ............................. | 369/275.1 |
| 5,479,382 | 12/1995 | Nishida et al. ........................... | 369/13 |
| 5,577,021 | 11/1996 | Nakatani et al. ..................... | 369/275.2 |
| 5,581,539 | 12/1996 | Horie et al. ........................... | 369/275.4 |
| 5,862,123 | 1/1999 | Horie et al. ........................... | 369/275.4 |

FOREIGN PATENT DOCUMENTS

| | | |
|---|---|---|
| 0 517 490 | 12/1992 | European Pat. Off. . |
| 0 605 924 | 7/1994 | European Pat. Off. . |
| 25 46 941 | 4/1976 | Germany . |

OTHER PUBLICATIONS

Patent Abstract of Japan, vol. 097, No. 003, Mar. 31, 1997, JP 08 315 415, Nov. 29, 1996.

*Primary Examiner*—Ali Neyzari
*Attorney, Agent, or Firm*—Oblon, Spivak, McClelland, Maier & Neustadt, P.C.

[57] ABSTRACT

An optical recording medium including a first recording level including a first active film having amorphous areas and crystalline areas, the first recording level being configured to produce a phase difference between an optical beam reflected by the amorphous areas and an optical beam reflected by the crystalline areas; and a second recording level superimposed on the first recording level and including a second active layer with first areas and second areas, the second recording level being configured to produce an intensity difference between an optical beam reflected by the first areas and an optical beam reflected by the second areas.

20 Claims, 4 Drawing Sheets

OPTICAL RECORDING MEDIUM HAVING TWO SUPERIMPOSED RECORDING LEVELS AND CORRESPONDING RECORDING DEVICE AND READING PROCESS

DESCRIPTION

1. Technical Field

The present invention relates to an optical recording medium or support having two superimposed levels, as well as the corresponding recording device and reading process. This medium can be in random form, but in most cases it is a disk. The present invention relates to all optical recording types, namely reading or writing, writable and/or rewritable procedures.

The invention can e.g. be used in the optical disk recording field, e.g. for a second generation, high recording capacity DVD-RAM (2.6 to gigabytes per disk).

2. Prior Art

Essentially two types of optical disks are known, namely those using the phase change of a solid material (crystalline phase or amorphous phase) and those using the magnetooptical properties of certain materials, particularly the polarization rotation of a light beam.

Intense research has been carried out for a considerable number of years on phase change optical disks. These disks operate on the principle according to which it is possible to pass in a reversible manner a material from an amorphous state to a crystalline state, as a function of the intensity and duration of a laser spot applied thereto. This principle also permits a direct overwriting of new informations on already written informations.

The recording area of a phase change disk is in the form shown in the attached FIG. 1. It is possible to see amorphous areas Za distributed between crystalline areas Zc, said amorphous areas representing the recorded binary information.

Such informations are read optically. A laser spot, generally guided by a groove, scans the surface of the disk and the reflecting wave is transmitted to a detection system. Thus, FIG. 2 shows a disk 10 illuminated by a laser 12 through a focussing lens 14. The reflected light passes through a cubic beam splitter 16. The exit pupil 18 covers a detector having several quadrants, generally four quadrants A, B, C, D. This detector generally comprises photodiodes (4 in the present case).

The intensity distribution in the exit pupil is a function of the reflection coefficients of the amorphous and crystalline areas illuminated by the laser spot. These coefficients are two complex numbers, which can be written:

$$\hat{r} = r \exp j\phi$$

where $\hat{r}$ is the amplitude reflection coefficient and $\phi$ the phase of the reflected wave. The intensity reflection of a light beam on the centre is equal to $r^2$.

FIG. 3 shows in greater detail the illuminated area of the disk, the laser spot carrying the reference 20. It partly covers an amorphous area Za. The relative displacement of the spot with respect to the area Za takes place in the direction of the arrow. In practice, the spot is fixed and the disk rotates. The intensity and phase of the reflected wave will depend on the illuminated amorphous and crystalline areas and will consequently vary during the relative displacement of the spot.

It is then possible to envisage two recorded information detection modes:

a) The most standard detection mode in phase change optical recording is a so-called sum mode, in which the sum is formed of the intensity detected by the four photodiodes arranged in the detector having four quadrants. This sum signal Ss is shown in the left-hand part of FIG. 4. In this case, the phase difference information is not taken into account.

b) In another detection mode, known as the differential mode, the difference between the signals supplied by two groups of two photodiodes arranged symmetrically (or more generally two groups of N photodiodes) is determined. The shape of this differential signal, i.e. Sd, is shown in the right-hand part of FIG. 4. In this case, the reading signal is proportional to the phase difference between the waves reflected respectively by the amorphous areas and by the crystalline areas illuminated by the reading spot. This detection mode, unlike the first, is sensitive to the passage of the spot from a crystalline area to an amorphous area and changes sign for an inverse transition. The amplitude of the transition is proportional to the quantity:

$$\Delta S = \frac{2 \log 2}{\pi} |r_a||r_c|\sin(\phi_c - \phi_a)$$

where a and c relate to the amorphous and crystalline states.

No confusion is made between the differential signal referred to hereinbefore and another signal, also used in this procedure, and which is also obtained by difference or subtraction and which is known as the push-pull signal. This signal is not used for the detection of recorded informations, but is used for tracking the track to be read. This track diffracts the incident laser beam and when the latter moves slightly away from the track, there is an unbalance between the diffraction intensities in orders +1 and −1. This unbalance is used for producing a push-pull signal on appropriate reception photodiodes.

Using A, B, C and D for designating the four signals supplied by a photodetector having four quadrants, the signal used in differential reading is the quantity (A+B)−(C+D), whereas the push-pull signal will be the (A+C)−(B+D) signal.

The values of the amplitude reflection coefficients $r_c$ and $r_a$ from the crystalline and amorphous areas can be adjusted by inserting the phase change material in a multilayer interferential system. The function of these supplementary layers or films is not limited to the optical aspect, but is accompanied by a protective function. They also influence the dynamics of thermal phenomena during recording.

The differential reading of phase change disks is particularly interesting for two reasons:

it firstly permits a greater flexibility of the structure of the system of films, which makes it possible to envisage high optical transmission stacks still having phase differences and consequently powerful signals;

it then permits the production of powerful signals on a single level [1].

However, this reading method has scarcely been developed up to now, because it moves away from the conventional procedure adopted for optical or compact disks of the preceding generation, i.e. that of reading in the "sum" mode.

It is true that the differential method suffers from a disadvantage. In the case of phase change optical recording, it is particularly difficult to accurately check or control the length of the recorded area (because a fluctuation known as jitter exists), which leads to a deterioration of the spectrum of the differential signal. However, solutions for obviating this disadvantage have been proposed [2].

The reading signals of magnetooptical disks result from a polarization rotation of the reading beam following reflection on the support. This rotation is a function of the magnetization direction of the domains illuminated by the laser spot. At present, the magnetooptical method is the only method requiring polarized optics. The signals read are also of a differential nature, but unlike in phase change recording, the signal is obtained by two supplementary photodiodes, which separate the two polarization directions.

FIG. 5 shows the corresponding reading device. The disk 30 is still illuminated by a laser 32 through a focussing lens 34. A cubic beam splitter 36 returns the light reflected by the disk to another cubic beam splitter 38, which makes it possible to split the polarizations. The parallel polarization component strikes a first detector 40, whilst the perpendicular polarization component strikes a second detector 42.

The areas of the disk are subdivided, as illustrated in FIG. 6, into positive magnetization areas $Z^+$, where the rotation of the polarization is positive $(+\theta)$ and negative magnetization areas $Z^-$, where the polarization rotation is negative $(-\theta)$.

Under these conditions, the difference between the signals received by the two detectors 40 and 42 is proportional to the projection of the polarization component of the light reflected by the disk to the perpendicular direction, from which is subtracted that of the parallel direction. This is diagrammatically illustrated in FIG. 7, where the parallel direction Dpar is plotted on the abscissa and the perpendicular direction Dperp on the ordinate. The angles $+\theta$ and $-\theta$ are counted with respect to the bisector.

Numerous solutions have been proposed or undergoing investigation for increasing the recording density of optical or compact disks. For the phase change technology, the most significant improvements relate to recording methods on the high and low parts of the groove, which permits a multiplication by two of the density [3]. Numerous investigations are also taking place with a view to reducing the wavelength of the lasers used and also for reducing the thicknesses of the substrates, so as to be able to increase the numerical aperture of the focussing lens [4]. These two improvements lead to a reduction of the size of the laser spot on the disk. However, only slow progress has been made in the production of short wavelength laser diodes.

Different methods for the etching and moulding of the laser spot guide groove make it possible to hope for a reduction in the spacing of the spiral and an improvement in its surface state [5].

The search for high recording densities has led in the case of phase change optical disk technology to the encountering of a difficulty linked with the limitation of the crystallization rates of the materials used, unlike in the case of magnetooptical materials for which the magnetization switching is much faster. For the latter method, the density increase passes via similar procedures, but specific improvements exist, such as the juxtaposing of various active films permitting masking, magnetic magnifying glass and direct overwriting methods.

For the future generation of compact, derived disks (known as DVD disks), certain laboratories are aiming at a two-sided solution by bonding two disks together. This requires the turning over of the medium or support and the production of a double reading device. At present, capacities of about 5 gigabytes have been obtained, which corresponds to the recording of a film slightly longer than two hours in MPEG2 format.

The present invention aims at increasing the recording capacity of such optical supports or media by doubling this capacity, but avoiding the aforementioned disadvantages.

Document [6] describes an information storage system having several planes and a recording medium usable in such a system. The information medium can have two levels, where informations are recorded in two different ways. The same optical beam reads these two levels. Two different measuring channels are provided, one operating with a sum signal and the other with a differential signal.

The present invention proposes an original, high performance means of this type, where there are separate reading modes for the two levels.

DESCRIPTION OF THE INVENTION

More specifically, the present invention relates to an optical recording medium, comprising a first recording level and a second recording level superimposed on the first, and means for reading said two levels by the same optical beam, but based on different principles, characterized in that the reading of the first level is based on the principle of a phase modulation of the optical beam and the reading of the second level is based on the principle of an intensity modulation of said optical beam.

The two recording levels operate either with active, phase change films, or active, magnetooptical films.

Preferably, the first and second recording levels comprise a stack of films with an active film intercalated between two dielectric films.

As the reading means are of a conventional nature, the invention requires no significant modification to the procedure of conventional optical disk readers, which is a considerable industrial and commercial advantage.

The present invention also relates to an optical recording device, comprising:

a recording medium with a first recording level and a second recording level superimposed on the first, means for illuminating said first and second levels, the second recording level being illuminated through the first, reading means able to receive the light reflected by the first level and by the second level, said means incorporating at least two photoreceivers, a first channel able to form the difference of the signals supplied by the photoreceivers and a second channel able to form the sum of the signals supplied by the detectors, characterized in that the reading of the first level is based on the principle of a phase modulation of the reflected beam, the first channel supplying the differential signal restoring the information recorded in said first level and in that the reading of the second level is based on the principle of an intensity modulation of the reflected beam, the second channel supplying the sum signal restoring the information recorded in said second level.

The present invention also relates to a process for reading an optical recording medium comprising a first recording level and a second recording level superimposed on the first, said two levels being read by the same optical beam, said beam being modulated by each level, the reading of the two levels being based on two different modulation types, characterized in that the reading of the first level is based on a phase modulation of the beam and that the reading of the second level is based on an intensity modulation of the beam.

DETAILED DESCRIPTION OF EMBODIMENTS

Figure 1:
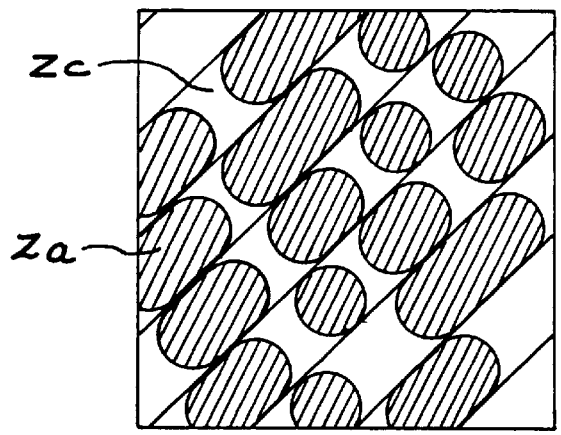
FIG. 1, shows the amorphous areas recorded in a crystalline matrix on a conventional phase change disk.
Figure 2:
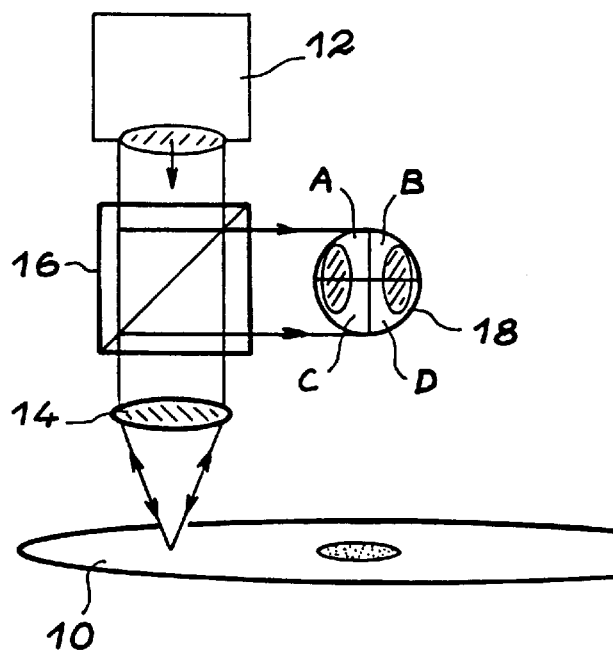
FIG. 2, shows the circuit diagram of a read-write device of a conventional phase change optical disk.
Figure 3:
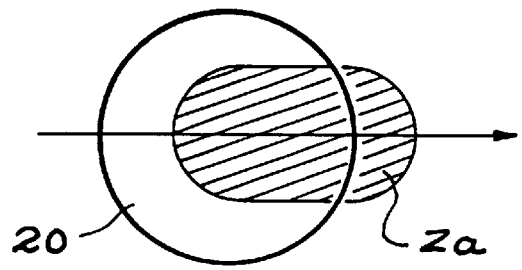
FIG. 3, shows an amorphous area read by a laser spot as shown in the prior art.
Figure 4:
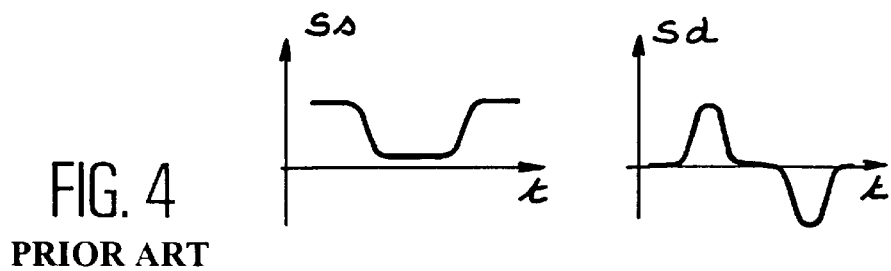
FIG. 4, shows the configuration of signals emitted by the sum and difference channels during the passage of a laser reading spot on an amorphous, recorded area on the crystalline base, in a conventional phase change disk.
Figure 5:
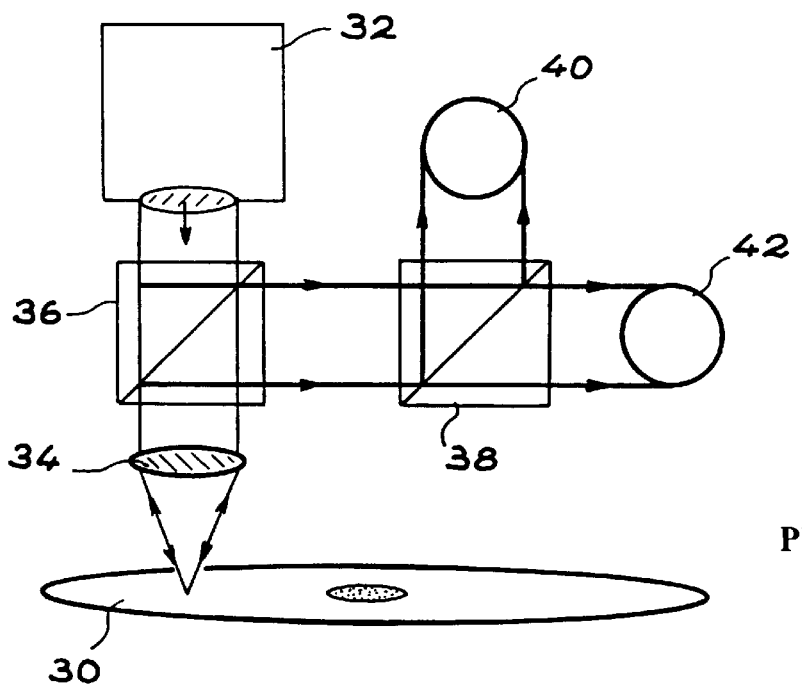
FIG. 5, a circuit diagram of a conventional magnetooptical disk reader.
Figure 6:
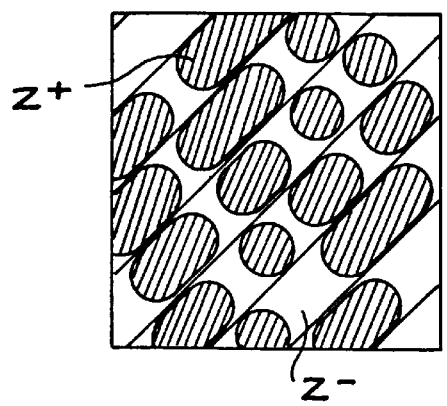
FIG. 6, shows magnetization areas recorded on a conventional magnetooptical disk.
Figure 7:
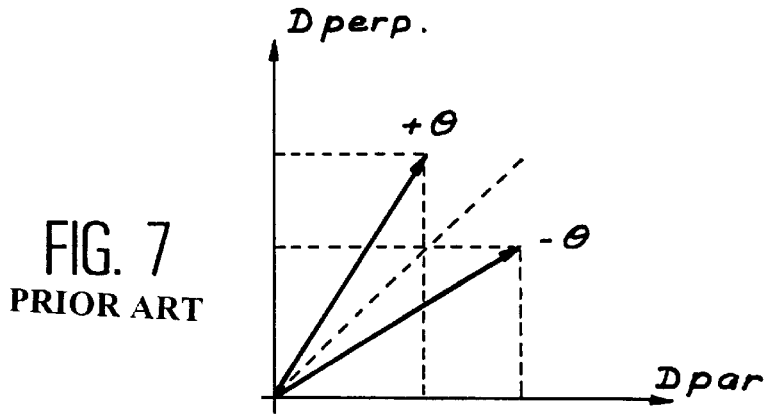
FIG. 7, shows the reading principle of a polarization rotation for a conventional magnetooptical disk.
Figure 8:
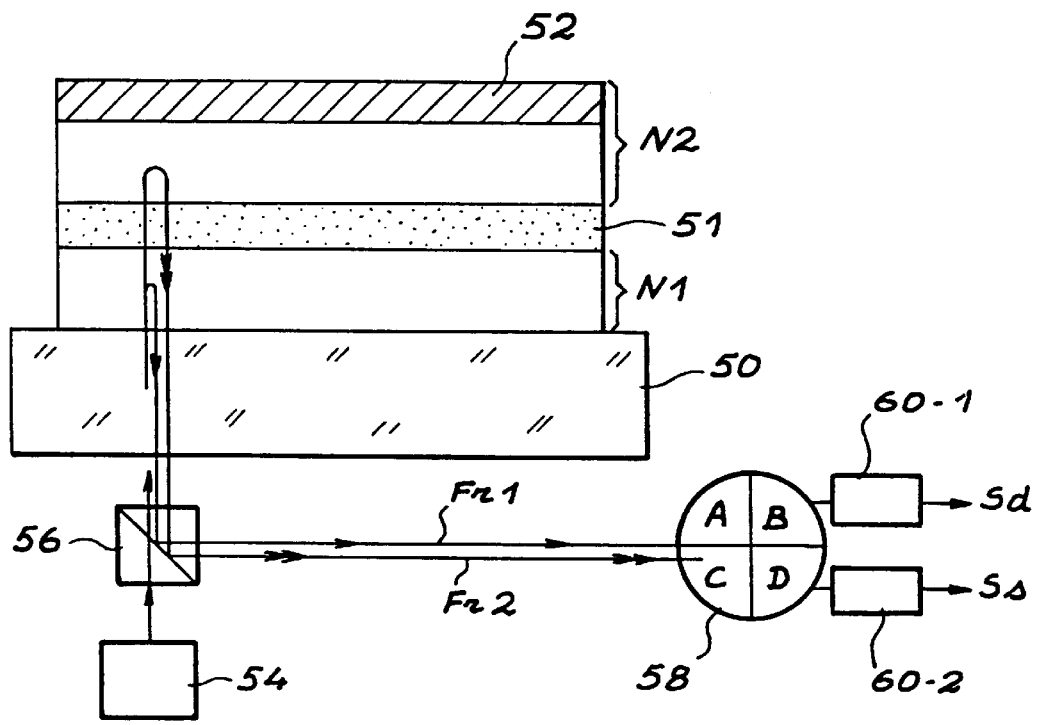
FIG. 8 illustrates a recording medium according to the invention.

FIG. 8 shows a recording medium or support according to the invention. This medium comprises a transparent substrate 50, a first recording level N1, a transparent spacer 51, a second recording level N2 incorporating a reflecting film 52.

In reading, said medium operates with the aid of means comprising a laser 54 illuminating the two recording levels (the second N2 being illuminated through the first N1), a cubic beam splitter 56, a photo-detection means 58, e.g. having four quadrants (A, B, C, D) and four photodetectors. Said means receives a first reflected beam Fr1 from the first level N1 and a second reflected beam Fr2 from the second level N2. The reading means also incorporate a first channel 60-1 operating according to a differential procedure and able to supply a differential signal Sd and a second channel 60-2, operating in a sum procedure and able to supply a sum signal Ss.

According to the invention, the first level operates in phase modulation and the signal Sd restores the information recorded in the first level. The second level operates in intensity modulation, so that it is the signal Ss which restores the corresponding information. As the two modulations are different, there is no interaction between the two informations read.

Figure 9:
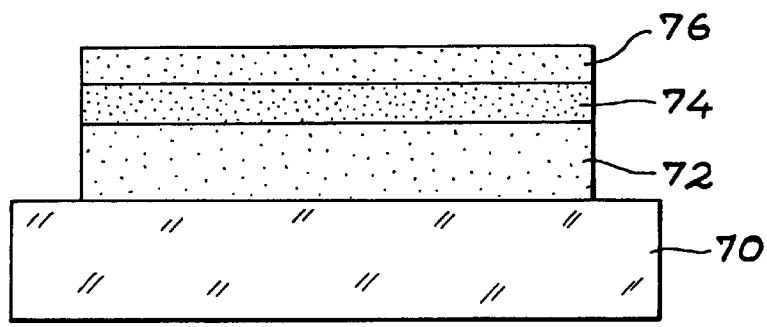
FIG. 9 illustrates an example of a recording level according to the present invention for which the signal read is optimized on the differential channel.

FIG. 9 shows a film stack example able to constitute the first level. It is possible to see on a transparent substrate 70, a first dielectric film 72, an active, phase change material film 74 and a second dielectric film 76.

For a phase change recordable level, in which the differential signal is optimized, it is e.g. possible to use films, whose properties, for a wavelength of 685 nanometers are as follows, n being the real part of the complex index and k the imaginary part:

|  | n | k |
|---|---|---|
| Transparent substrate (70) | 1.58 | 0 |
| Dielectric films (72, 76) | 2.15 | 0 |
| Amorphouse state | 3.71 | 1.63 |
| Crystalline state | 3.95 | 4.12 |
| Phase change material (74) | of type GeSbTe | |

Combinations of these three optical films exist for which the differential signal is optimized (the difference between the phase of the reflected wave of the crystalline areas and the phase of the reflected wave of the amorphous areas is equal to 90°).

When the index of the dielectric film 76 is higher than the index of the output environment, it is possible to classify these solutions in two types:
- solutions with a very thick dielectric film 76 (around 100 nanometers),
- solutions with a dielectric film 76 of limited thickness (a few nanometers).

Figure 10:
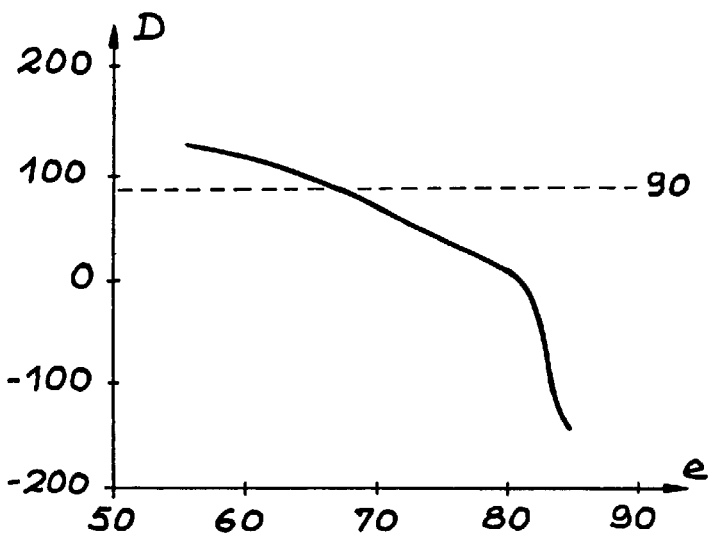
FIGS. 10A and 10B show the variation of the phase difference between the light waves respectively reflected by the amorphous and crystalline areas, as a function of the thicknesses of the films used.
Figure 10:
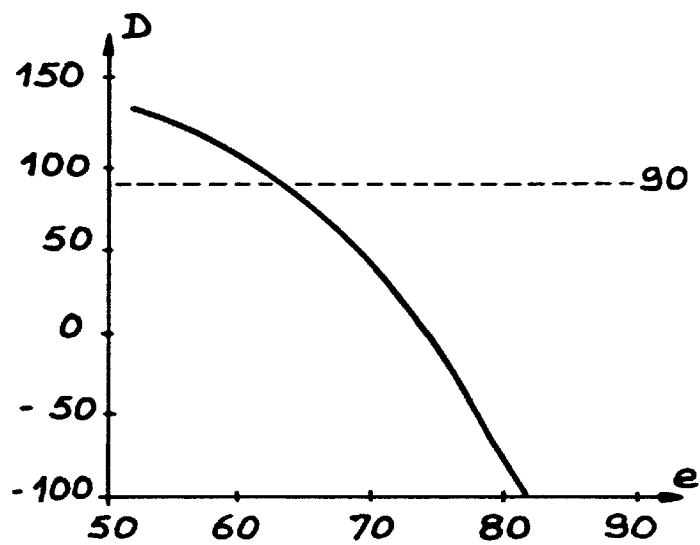

FIGS. 10A and 10B give the phase differences D expressed in degrees, calculated for a phase change material GeSbTe thickness of 20 nanometers, as a function of the thickness of the first dielectric film (72). For FIG. 10A, the thickness of the second dielectric film is 5 nm, whereas for FIG. 10B it is 130 nm.

The advantage of a recording level like that shown in FIG. 9 is that there is no reflection film, so that a second level can be added. This second level can be recorded once or rerecorded and is of the phase change type (reading on sum channel) or magnetooptical type (reading on differential channel). The transmission of such a first level is controllable (by retaining a phase rotation of 90°) by more particularly acting on the thickness of the phase change material and on the difference of the indices between the output environment (generally the spacer) and the dielectric 76.

With regards to the second level, it can be constituted by a writable or rewritable stack. On opting for phase change technology, a choice will be made of films optimizing the reflection variations depending on whether the material is amorphous or crystalline, in order to obtain a good sum signal on the sum channel (channel 60-2 in FIG. 8).

As an example of the second, high intensity modulation level, it is possible to use three films, whose thicknesses e are given in the following table, where the subscripts 1 and 2 correspond to the first and second dielectric film and the subscript a to the active film and the subscript al to the aluminium assumed as terminating the second level, the quantity $\Delta R$ being the reflectivity difference between the amorphous and crystalline areas:

| $e_1$ | $e_a$ | $e_2$ | $e_{al}$ | $\Delta R$ |
|---|---|---|---|---|
| 155 | 27.5 ($Ge_{23.1}Sb_{22.1}Te_{54.8}$) | 17.5 | 150 | 34.7 |
| 152.5 | 25 ($Ag_{11.7}In_{7.4}Sb_{55}Te_{25.9}$) | 10 | 150 | 16.3 |
| 40 | 25 ($In_{50}Sb_{16.7}Te_{33.3}$) | 72.5 | 150 | 15.4 |

In order to further illustrate the invention, it is possible to give a precise practical example for a DVD-type application. The first recording level is in accordance with the first example and the second level in accordance with the second example given hereinbefore. The following succession of materials deposited on a transparent substrate is then obtained:

| Type of material | Optical index (n/k) at 685 nanometers | Thickness (nanometers) |
| --- | --- | --- |
| Level 1 | | |
| Dielectric film $(ZnS)_{80}((SiO_2)_{20}$ | (2.1/0) | 65 |
| Phase change material film | (3.71/1.63) amorphous | |
| $Ge_{23.1}Sb_{22.1}Te_{54.8}$ | (3.95/4.12) crystalline | 20 |
| Dielectric film $(ZnS)_{80}(SiO_2)_{20}$ | (2.1/0) | 130 |
| Level 2 | | |
| Dielectric film $(ZnS)_{80}(SiO_2)_{20}$ | (2.1/0) | 152.5 |
| Phase change material film | (3.89/2.32) amorphous | |
| $Ag_{11.7}In_{7.4}Sb_{55}Te_{25.9}$ | (3.48/3.36) crystalline | 25 |
| Dielectric film $(ZnS)_{80}(SiO_2)_{20}$ | (2.1/0) | 10 |

The spacer can be of any transparent material, e.g. silica, its thickness being e.g. 50 microns.

The following table gives the three possible cases for each level. All nine combinations which can be implemented on the basis of this table are possible, provided that the nature of the level 1 chosen permits a differential reading:

| Level 1 | Level 2 |
| --- | --- |
| differential reading | sum reading |
| prerecorded | prerecorded |
| writable | writable |
| rewritable | rewritable |

Prerecorded informations are those informations which are directly etched on the substrate, or any other support or medium obtained on the basis of a replication and which may require the addition of optical films to permit satisfactory reading.

Writable is used for designating optical film systems on which the written information cannot be erased, such as stacks incorporating so-called dye polymer materials or any other material for which the optical properties are modified-by the application of a laser pulse. It should be noted that a rewritable level can be used in the same way as a writable level.

The term rewritable is used for designating levels having e.g. phase change or magnetooptical materials or any other material for which the information is not written permanently and can be erased.

The various components of the medium or support described herein-before can be implemented in three stages:

1) Producing a transparent substrate

Transparent substrate production processes are well known in the optical disk industry:
  a) matrix: the matrix which will permit the replication of substrates is obtained following several electrodeposition stages based on an original etching obtained by the laser ablation of a photosensitive film, where, apart from the guide groove, said matrix can carry non-erasable informations,
  b) plastic substrates: obtained by moulding a polymer on the matrix,
  c) glass substrates: obtained by etching a transparent resin deposited on a flat glass substrate.

2) Producing the films

The films can be produced in various ways, namely by cathodic sputtering, vaporization, laser ablation on one or more targets or by centrifugal deposition. These deposition processes may require the introduction of a gas into the deposition enclosures, which may be reactive or constitute a dopant for the films produced.

The nature of the films used will depend on the technology employed in the considered recording level. For example, U.S. Pat. No. 5,289,453 describes dielectric films, phase change materials and reflectors, which are currently used for phase change optical recording.

3) Producing the spacer and the protective resin
  a) spacer: it can be of photopolymerizable resin or dielectric material,
  b) a protective resin can be added to the upper face of the disk and said resin can be constituted by a polymer photopolymerizable under ultraviolet radiation.

The above description relates to a support or medium with a substrate, whereof only one face is covered by the stack of two recording levels. Obviously the invention is of a more general nature and also relates to the case where each of the faces of the substrate is covered by such a stack. The medium would then be of the two-sided type.

REFERENCES

[1] Chubing PENG and M. MANSURIPUR, Technical Digest, ODS 1997, TuA3, pp 32–33.

[2] Tatsunori IDE and Mitsuya OKADA, Appl. Phys. Lett. 64 (13), pp 1613–1614.

[3] Takeo OHTA et al., Optoelectronics-Devices and Technologies, vol. 10, No. 3, pp 361–380.

[4] Takeo OHTA et al., Jpn. J. Appl. Phys., vol. 32 (1993) Part 1, No. 11B, pp 5214–5218.

[5] Seiji MORITA et al., Technical Digest ODS 1997, WB2, pp 92–93.

[6] EP-A-0 605 924.

We claim:

1. An optical recording medium comprising:
  a first recording level comprising a first active film configured to have amorphous areas and crystalline areas, wherein said first recording level is configured to produce a phase difference between an optical beam reflected by said amorphous areas and an optical beam reflected by said crystalline areas; and
  a second recording level superimposed on the first recording level and comprising a second active layer configured to have first areas and second areas, said second recording level being configured to produce an intensity difference between an optical beam reflected by said first areas and an optical beam reflected by said second areas.

2. The recording medium according to claim 1, further comprising two dielectric films configured to sandwich said first active layer.

3. The recording medium according to claim 1, further comprising a transparent spacer configured to separate said first and second recording levels.

4. The recording medium according to claim 1, further comprising a transparent substrate configured to support said first recording level.

5. The recording medium according to claim 1, further comprising a reflecting film configured to cover said second recording level.

6. The optical recording medium according to claim 1, wherein said second active layer comprises a phase change material, said first and second areas of said second recording level being respectively amorphous areas and crystalline areas.

7. The optical recording medium according to claim 1, wherein said second active layer comprises a magnetooptical material, said first and second areas of said second recording level having different magnetization directions.

8. The optical recording medium according to claim 1, wherein said phase difference produced by said first recording level is about 90°.

9. The optical recording medium according to claim 4, wherein said two dielectric films have thicknesses so that said phase difference produced by said first recording level is about 90°.

10. The recording medium according to any one of claims 2 to 5 or 1 to 9, comprising a substrate having a first face covered by said first recording level and a second face covered by said second recording level.

11. An optical recording medium comprising:

a first recording level comprising a first active film having amorphous areas and crystalline areas, said first recording level being configured to produce a phase difference between an optical beam reflected by said amorphous areas and an optical beam reflected by said crystalline areas; and a second recording level superimposed on the first recording level and comprising a second active layer having first areas and second areas, said second recording level being configured to produce an intensity difference between an optical beam reflected by said first areas and an optical beam reflected by said second areas.

12. The optical recording medium according to claim 11, wherein said second active layer comprises a phase change material, said first and second areas of said second recording level being respectively amorphous areas and crystalline areas.

13. The optical recording medium according to claim 11, wherein said second active layer comprises a magnetooptical material, said first and second areas of said second recording level having different magnetization directions.

14. The recording medium according to claim 11, further comprising two dielectric films configured to sandwich said first active layer.

15. The recording medium according to claim 11, further comprising a transparent spacer configured to separate said first and second recording levels.

16. The recording medium according to claim 11, further comprising a transparent substrate configured to support said first recording level.

17. The recording medium according to claim 11, further comprising a reflecting film configured to cover said second recording level.

18. The recording medium according to any one of claims 11 to 17, comprising a substrate having a first face covered by said first recording level and a second face covered by said second recording level.

19. The optical recording medium according to claim 11, wherein said phase difference produced by said first recording level is about 90°.

20. The optical recording medium according to claim 14, wherein said two dielectric films have thicknesses so that said phase difference produced by said first recording level is about 90°.

* * * * *